(12) United States Patent
Hollenbeck et al.

(10) Patent No.: US 10,186,956 B2
(45) Date of Patent: Jan. 22, 2019

(54) UNIVERSAL VOLTAGE AND PHASE INPUT POWER SUPPLY FOR ELECTRICAL MOTORS

(71) Applicant: Nidec Motor Corporation, St. Louis, MO (US)

(72) Inventors: Robert K. Hollenbeck, Fort Wayne, IN (US); Justin A. Anteau, Fort Wayne, IN (US)

(73) Assignee: Nidec Motor Corporation, St. Louis, MO (US)

(*) Notice: Subject to any disclaimer, the term of this patent is extended or adjusted under 35 U.S.C. 154(b) by 339 days.

(21) Appl. No.: 14/947,887

(22) Filed: Nov. 20, 2015

(65) Prior Publication Data

US 2017/0149351 A1    May 25, 2017

(51) Int. Cl.
| H02M 1/42 | (2007.01) |
| H02M 3/158 | (2006.01) |
| H02M 1/08 | (2006.01) |

(52) U.S. Cl.
CPC ....... *H02M 1/4216* (2013.01); *H02M 1/4208* (2013.01); *H02M 1/4225* (2013.01); *H02M 3/1584* (2013.01); *H02M 1/08* (2013.01); *H02M 1/081* (2013.01); *H02M 1/42* (2013.01); *Y02B 70/126* (2013.01)

(58) Field of Classification Search
CPC .... H02M 1/42; H02M 1/4208; H02M 1/4216; H02M 1/4225; H02M 1/08; H02M 1/081
See application file for complete search history.

(56) References Cited

U.S. PATENT DOCUMENTS

| 9,240,737 | B2* | 1/2016 | Sakae ................ | H02M 3/1584 |
| 9,692,312 | B2* | 6/2017 | Yuasa ................. | H02M 5/458 |
| 9,722,488 | B2* | 8/2017 | Ishizeki ............. | H02M 1/4225 |
| 2007/0200516 | A1* | 8/2007 | Miyazaki ............. | H02M 1/08 |
| | | | | 318/400.17 |
| 2014/0223949 | A1* | 8/2014 | Sakae ................ | H02M 3/1584 |
| | | | | 62/324.1 |
| 2015/0229205 | A1* | 8/2015 | Buthker ............. | H02M 1/4225 |
| | | | | 363/126 |

OTHER PUBLICATIONS http://www.onsemi.com/pub/Collateral/FAN9673-D.pdf (reviewed on 2013).*

* cited by examiner

*Primary Examiner* — Gary L Laxton
*Assistant Examiner* — Rafael O De Leon Domenech
(74) *Attorney, Agent, or Firm* — Maginot Moore & Beck LLP

(57) ABSTRACT

A power supply generates power factor corrected power from AC power having one or more phases and different levels of output voltages. The power supply includes a power factor correction circuit that charges a capacitor through at least one inductor. Each inductor of the at least one inductor is independently connected to the capacitor to charge the capacitor with rectified power.

14 Claims, 4 Drawing Sheets

UNIVERSAL VOLTAGE AND PHASE INPUT POWER SUPPLY FOR ELECTRICAL MOTORS

TECHNICAL FIELD

This disclosure relates generally to power supplies for electrical motors, and more particularly, to power supplies for electrical motors capable of being connected to a wide range of power sources.

BACKGROUND

Electrical motors are used in a variety of applications. These applications include refrigeration units, pumping systems, and the like. Typically, the input power to a power supply for operating an electrical motor or other electrical equipment can vary depending upon the environment in which the power supply will be used. For example, in some environments, single phase, 50 or 60 Hz AC power is available to power an electrical motor, while in other environments, the input power is three phase, 50 or 60 Hz AC power. Not only does the number of phases differ for different sources of input AC power, but the voltage levels differ as well. Single phase input power can include voltages in a range of 100 VAC to 277 VAC and three phase input power can include voltages in a range of 208 VAC to 575 VAC.

Connecting AC electrical power directly to an electrical motor is rarely the most efficient manner of operating an electrical motor or other electrical equipment. The attenuation of noise in the input power, regulation of the voltage and current levels with reference to the changing loads, and controlling the power factor for these loads are important considerations. Additionally, some electrical equipment requires conversion of the AC power to DC power before the power can be effectively applied to the equipment. The regulation, AC/DC conversion, and power factor control circuits vary for single phase and multi-phase input power sources as well as for different voltage levels. Being able to provide a single electrical circuit for regulating and controlling different sources of AC power for electrical power supplies would be useful.

SUMMARY

A power supply receives input AC power having a different number of phases over a wide range of voltages and generates power factor corrected power. The power supply includes at least three input connections, each input connection is configured to receive a conductor from an AC power source, a rectifier electrically connected to the at least three input connections, the rectifier having a plurality of diodes that are configured to rectify AC power having one or more phases, a capacitor electrically connected to the rectifier, and a power factor control and boost circuit electrically connected to the rectifier and to the capacitor. The power factor control and boost circuit having at least one inductor, at least one diode that is different than the plurality of diodes of the rectifier, each at least one inductor being electrically connected to the capacitor through one of the at least one diode in a one-to-one correspondence, and a controller. The controller is configured to electrically connect each inductor of the at least one inductor to electrical ground independently of the other inductors of the at least one inductor and to electrically connect each inductor of the at least one inductor to the capacitor independently of the other inductors of the at least one inductor to charge the capacitor through each of the inductors of the at least one inductor and each of the diodes of the at least one diode in the power factor control and boost circuit independently with current from the diodes of the at least one diode in the power factor control and boost circuit.

A method of supplying power provides power factor corrected power from input AC power having a different number of phases over a wide range of voltages. The method includes connecting an AC power source to a rectifier through input connections configured to receive single phase and three phase AC power, rectifying AC power from the AC source with a plurality of diodes in the rectifier that are configured to rectify AC power having one or more phases, and selectively connecting with a controller a capacitor to one end of each inductor of at least one inductor independently of the other inductors of the at least one inductor to charge the capacitor with current through each inductor of the at least one inductor independently.

DETAILED DESCRIPTION

Figure 1:
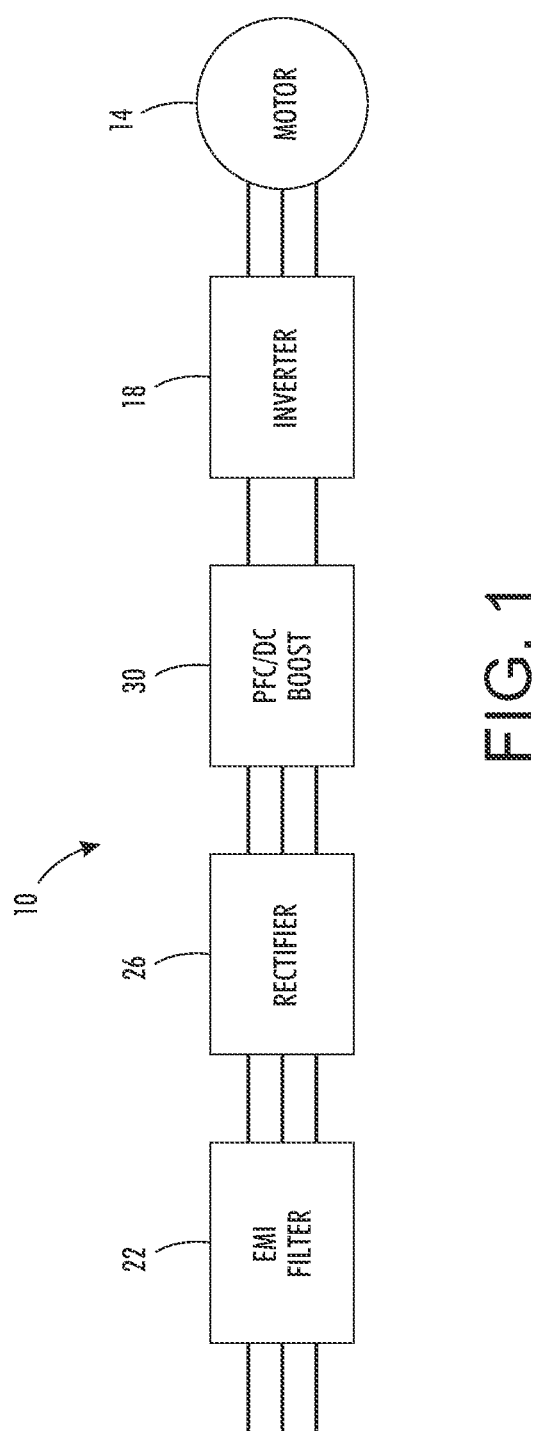
FIG. 1 is a block diagram of a power supply that can convert AC power having different numbers of phases over a wide range of voltages for delivery to electrical equipment.

FIG. 1 shows a block diagram of a power supply 10 that is electrically connected to an electrical motor 14 through an inverter 18. Power supply 10 is capable of producing DC power with adequate current for meeting the requirements of the motor 14. The power supply 10 converts AC power, such as a line voltage, regardless of voltage range or number of phases, to DC power. The inverter 18 is a well-known circuit for producing AC power as a square wave, modified sine wave, or pulse width modulated wave and is not further described herein. The electrical motor 14 can be any of a number of known electrical motors, such as induction motors, permanent magnet motors, switched motors, reluctance motors, or the like. While the power supply 10 is described as operating an electrical motor, the electrical motor can be replaced with other equipment that requires electrical power for its operation.

The power supply 10 includes an EMI filter network 22, a rectifier 26, and a power factor controller/DC boost (PFC) circuit 30. The EMI filter 22 is a network of passive elements that attenuates noise conducted to the AC power input signal. The EMI filter typically also includes spike and surge protection in the form of metal oxide variable resistors (MOVs, also called varistors), and fuses. The rectifier 26 is a bridge of diodes that performs a full wave rectification of the input signal by inverting the negative cycles of the one or more phases of the AC power input signal to positive cycles. The rectified power signal is provided to the PFC circuit 30 for conversion to a DC power signal.

The PFC circuit 30 uses inductors to charge a bank of capacitors to ensure the provision of DC power at current levels required for the operation of the electrical motor 14 through the inverter 18. The PFC circuit 30 is configured to provide power factor correction for single phase AC power. The PFC circuit can correct the power factor for single phase power to 0.98 to 0.99. For three phase AC power, the PFC circuit does not correct the power factor as effectively, but it does boost the DC power level adequately for supplying the inverter 18 and the electrical motor 14.

Figure 2:
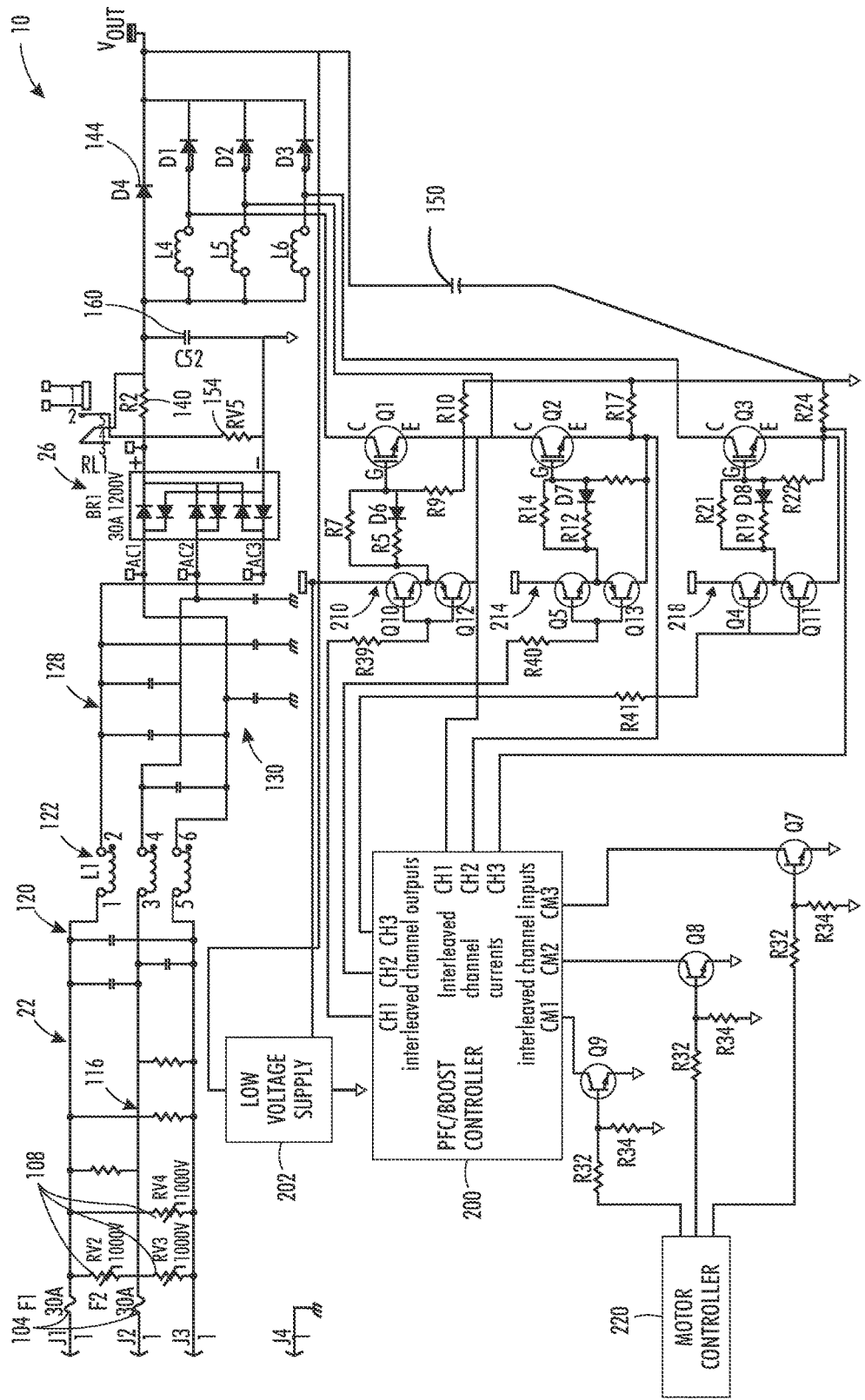
FIG. 2 is a circuit diagram for one embodiment of the power supply in FIG. 1.

One embodiment of the supply 10 shown in FIG. 1 is depicted in FIG. 2. The EMI filter 22 includes four input connections J1, J2, J3, and J4, a pair of fuses 104, three MOVs 108, a network of resistors 116 and capacitors 120 that are connected through three inductors to another network of capacitors 128. As used in this document, input connections means a receptacle configured to receive a conductor of an input power lead. To connect a single phase AC power source to the supply 10, one input power lead is connected to J1 and the other input power lead is connected to J3. Alternatively, a single phase power supply can be connected to J1 and J2 or between J2 and J3. For a three phase AC power source, the three input leads of the power source are connected to J1, J2, and J3. The earth ground lead of the single phase or three phase power source is connected to J4.

To protect the supply 10 from spikes and surges, fuses 104 are connected in series with J1 and J2 and MOVs 108 are connected between J1 and J2, between J2 and J3, and between J1 and J3. The fuses 104 open in response to the input current exceeding normal operating current. The MOVs 108 operate as low impedance circuits in response to a voltage occurring on a MOV that exceeds typical power line voltages. Thus, the fuses disconnect the supply 10 from the power source if the current is too high and the MOVs shunt one input lead to another input lead if the voltage between the two input leads exceeds a predetermined voltage. The capacitor network 120 removes transient noise to the input power and the resistor network 116 helps discharge the capacitors in the capacitor network 120. The inductors 124 in conjunction with capacitor networks 120, 128, and 130 act as an electromagnetic interference (EMI) filter to reduce the noise conducted to the input AC power.

Figure 3:
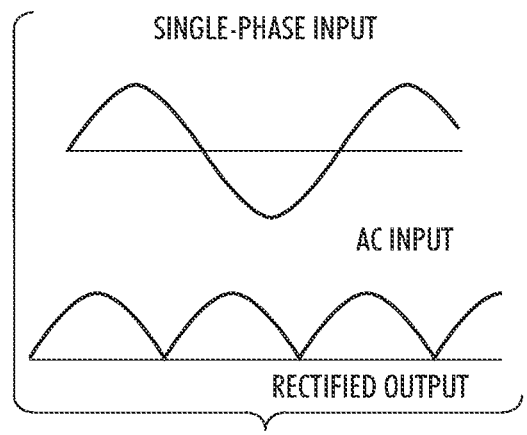
FIG. 3 is a graph of rectified single phase AC power.
Figure 4:
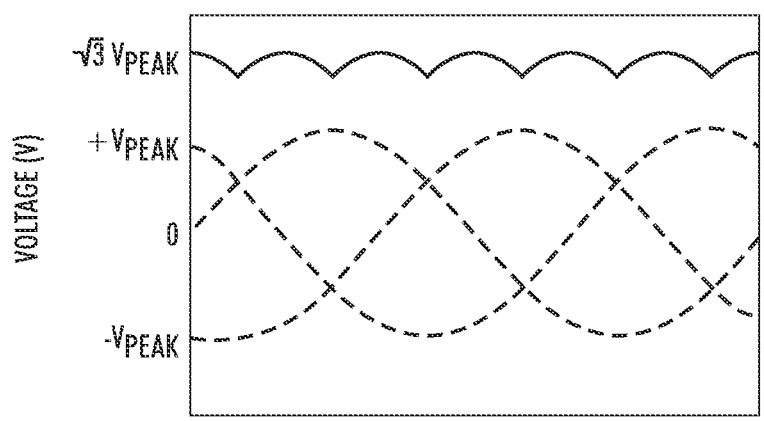
FIG. 4 is a graph of rectified three phase AC power.

After the power has been filtered by EMI filter 22, the filtered single phase AC power is provided to rectifier 26 at connection AC1 and the return for the single phase power is connected at AC3. The filtered three phase AC power, if a three phase AC power source is connected to J1, J2, and J3, is provided to the rectifier by supplying one phase of the AC power at AC1, a second phase of the AC power at AC2, and a third phase of the AC power at AC3. If single phase AC power is supplied at AC1 and AC3 to rectifier 26, then the upper two diodes and the lower two diodes rectify the AC power into the form shown in FIG. 3. FIG. 3 depicts about a cycle and a half of single phase power and the corresponding rectified form of the single phase power. Although single phase power has been described as being connected to AC1 and AC3 in this example, it could be connected alternatively to AC1 and AC2 or to AC2 and AC3. If three phase AC power is supplied at AC1, AC2, and AC3 to rectifier 26, then all six diodes of the rectifier rectify the AC power into the form shown in FIG. 4. FIG. 4 depicts one cycle of the input three phase power and the corresponding rectified form of the three phase power. The input three phase power has three phases, each of which is 120 degrees out of phase with another phase of the input power. The amplitudes of each phase are $+V_{peak}$ and $-V_{peak}$. The overlap between the phases enables the voltage of the rectified form to be positive and remain greater than $V_{peak}$. Specifically, the rectified waveform has a maximum magnitude of $\sqrt{3} * V_{peak}$. In one embodiment, the three phase input AC power is 266 VAC Line-to-Neutral at 60 Hz and the rectified waveform has six peaks of 651 VDC per input cycle as shown in FIG. 4. For an input single phase AC power source of 120 VAC at 60 Hz, the rectified waveform has two peaks of 168 VDC per input cycle as shown in FIG. 3.

The rectified power output by the rectifier 26 is provided to a resistor 140, which is connected in series with the positive output of the rectifier 26. This resistor helps limit the in-rush DC current to the capacitor 150 when the capacitor begins to accumulate charge. Also, a MOV 154 is provided between the positive and negative outputs of the rectifier 26. This MOV 154 shunts these two outputs to one another in response to the voltage exceeding a predetermined threshold. This operation helps protect the PFC circuit 30 from damage. Additionally, another controller 220 closes the contacts of the relay 156 prior to starting the electrical motor 14 to bypass the resistor 140 during operation of the motor. The rectified power charges capacitor 160 so the capacitor can operate as a low impedance source for the PFC circuit 30 and provide the AC reference for performing power factor control. The diode 144 enables the capacitor 160 to charge the capacitor 150 before the PFC circuit 30 senses the output voltage $V_{out}$ has reached a predetermined level for commencing operation of the circuit 30. The other controller 220 is also connected to the CM1, CM2, and CM3 connections of controller 200 through transistors Q9, Q8, and A7, respectively, to enable one to three boost functions to be performed by the controller 200 depending upon the power level required from the supply to operate the motor 14.

In general, power factor controller 200 selectively operates the insulated-gate bi-polar transistors (IGBTs) Q1, Q2, and Q3 to distribute the charging of the capacitor 150 through the inductors L4, L5, and L6. Although FIG. 2 shows Q1, Q2, and Q3 as IGBTs, other types of transistors, such as field effect transistors (FETs), gallium nitride (GaN) transistors, and the like can be used as well. Once the capacitor 150 is charged to approximately 50 vdc, the voltage $V_{out}$ operates a low voltage supply 202, which provides a voltage to controller 200 and the collectors of transistors Q10, Q5, and Q4. The controller 200 also outputs signals to the gates of the IGBTs Q1, Q2, and Q3, respectively, through driver circuits 210, 214, and 218, respectively, to activate and deactivate the transistors selectively. The driver circuits 210, 214, and 218 are shown in emitter-follower transistor configurations. When the controller activates the NPN transistor, the transistor provides adequate current to charge the gate capacitance of the connected IGBT and, when the controller deactivates the NPN transistor, the PNP transistor is activated so it pulls the charge out of the gate of the IGBT to electrical ground. Although the power produced by the supply 10 is shown as being stored in a single capacitor 150, a plurality of capacitors could also be configured to store the power for the inverter.

The collectors of the IGBTs Q1, Q2, and Q3 are electrically connected to the inductors L4, L5, and L6, respectively. Thus, when each IGBT is turned on, the inductor is electrically connected to control ground through the IGBT and when each IGBT is turned off, the current flowing in the inductor is electrically connected to the capacitor 150 to charge the capacitor 150 through the diodes D1, D2, or D3, respectively. By operating the IGBTs Q1, Q2, and Q3 so one is on and the other two are off with some overlap, the charging current for the capacitor bank is distributed over the three inductors. This type of distribution is known as interleaved operation and enables the IGBTs, inductors, and diodes to have lower current ratings than would be necessary if only one IGBT, inductor, and diode was used to charge the capacitor 150. Additionally, the IGBTs are operated so the inductors may not fully discharged during operation of the PFC circuit 30.

As noted previously, the controller 200 can regulate the three channels of the power supply in one of three modes. The three modes of channel operation are determined by the controller 220 providing or removing a signal to the resistors connected to the base of transistors Q9, Q8, and Q7. When a signal is applied to the base of one of these transistors, the connections CM1, CM2, or CM3 connected to the collector of the activated transistor is pulled below 0.2 VDC and the corresponding channel is enabled. When the signal is removed from the resistors connected to the base of one of the transistors Q7, Q8, or Q9, the connection CM1, CM2, or CM3 connected to the collector of the corresponding transistor returns to a voltage greater than 4 VDC since the current sourced by the connection provides a voltage that disables operation of the corresponding channel.

Figure 6:
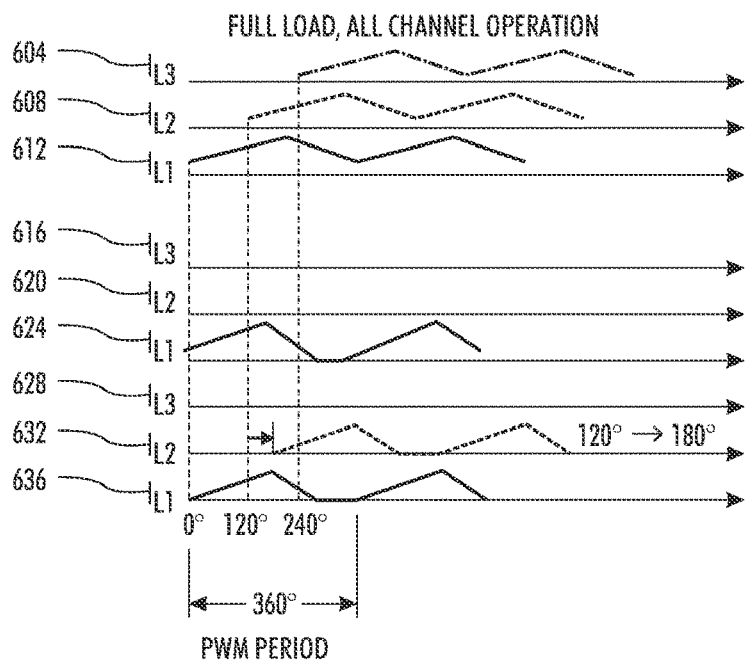
FIG. 6 is a graph depicting currents in the three inductors of the power supply in FIG. 1 in three different modes of operation.

FIG. 6 depicts the current through the three inductors L4, L5, and L6 in the three modes of channel operation. The three currents 604, 608, and 612 show the current waveforms when all three channels are enabled for operation. Currents 616, 620, and 624 illustrate the current waveforms when only one channel is enabled for operation and currents 628, 632, and 636 depict the current waveforms when two of the channels are enabled for operation. When all of the channels are enabled at full power, each channel enables current to flow through its corresponding inductor to charge the capacitor bank for approximately 120 electrical degrees of the 360 degree period for pulse width modulation (PWM) control of the channels. Thus, the channels are interleaved at 120 degree intervals. When two channels are operated, the two channels operate for approximately 180 electrical degrees out of the 360 degree cycle. This mode of channel operation is used for mid-power level outputs. Single channel operation is utilized for low output power levels where approximately one-third of the full power level is needed by the motor 14. The maximum duty cycle for this mode of operation is slightly less than 180 electrical degrees.

In one embodiment, the controller 200 is a Fairchild FAN9673, which is available from Fairchild Semiconductor Corporation of San Jose, Calif. It is configured to provide power factor correction for a single phase AC power source. This controller has been incorporated in a power supply that can be connected to a single phase AC power source or a three phase AC power source. While the power factor correction that the controller 200 provides for three phase AC power is not as effective as the power factor correction for single phase AC power, it is better than no power factor correction at all. Additionally, the DC voltage boost provided by the controller 200 enables the PFC circuit 30 to charge the capacitor 150 reliably with rectified three phase power through the three inductors L4, L5, and L6. Thus, DC power is provided to the inverter 18 using the three IGBTs so IGBTs with lower current ratings can be used. The controller performs power factor correction in the embodiment described above by employing two control loops. One control loop is a current control loop and the other control loop is a voltage control loop. The current control loop shapes current through each of the inductors L4, L5, and L6 using a current output by a gain modulator within the controller. The gain modulator produces the output current with reference to the instantaneous input voltage, a voltage proportional to the output voltage at the rectifier 26, and a voltage corresponding to an error between the output voltage of the circuit 30 and its expected voltage. The voltage control loop regulates the output voltage of the circuit 30 with reference to the voltage corresponding to an error between the output voltage of the circuit 30 and its expected voltage.

Figure 5:
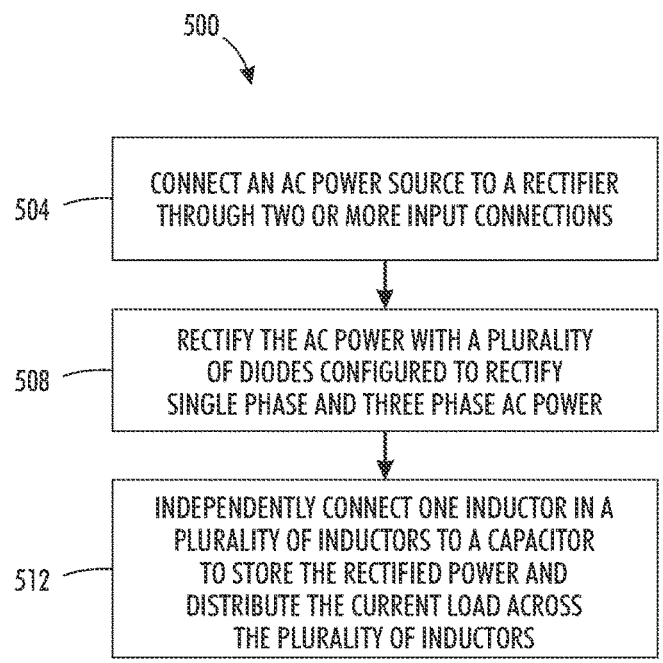
FIG. 5 is a flow diagram of a method for supplying DC power to an inverter for operation of electrical equipment.

A method of operating a power supply enables DC power to be supplied to an inverter for operating an electrical motor. A flow diagram for one embodiment of the process is shown in FIG. 5. The process 500 begins with the connecting of an AC power source to a rectifier through two or more input connections (block 504). The AC power received from the AC source is rectified with a plurality of diodes in the rectifier that are configured to rectify single phase AC power and three phase AC power (block 508). After the power is rectified, controller 220 turns on one or more IGBTs Q1, Q2, or Q3 causing current to flow through the respective inductor to which the IGBT was connected. When the IGBT is turned off, the current through the inductor to which the IGBT was connected is transferred to the diode to which the IGBT and inductor were connected. This current transfer charges capacitor 150 and output load (block 512). DC power stored in the capacitor is provided to an inverter to operate an electrical motor.

As noted above, the selective connection of the plurality of inductors includes selectively activating with the controller three transistors, which can be IGBTs, to enable each transistor to connect the one end of one inductor in the plurality of inductors to electrical ground for a first predetermined number of electrical degrees of a pulse width modulated (PWM) period and to deactivate each transistor to electrically connect the one end of the one inductor to the capacitor for a second predetermined number of electrical degrees of the PWM period to enable the rectified power to charge the capacitor through each inductor independently. The gain modulator satisfies the power factor control function by simulating a resistive load to the diode bridge. The controller 200 performs this simulation by setting the pulse width modulation (PWM) value at the product of the diode bridge voltage/peak diode bridge voltage and current required by the gain modulator. To provide a low impedance source for the inductors and minimize the noise on the full wave rectified AC output from the diode bridge, the rectified power can be stored in a capacitor having one end electrically connected to a positive output of the rectifier and another end electrically connected to a negative output of the rectifier and to electrical ground. The one end of the capacitor is also electrically connected to the inductors. The capacitor operating as a low impedance power source can also be electrically connected to the capacitor 150 through a diode having an anode electrically connected to the end of the capacitor connected to the positive output of the rectified and a cathode electrically connected to the plurality of capacitors. This diode is used to further limit the diode current (D1, D2, D3) when the circuit is turned on.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed:

1. A power supply for electrical equipment comprising:
at least three input connections, each input connection is configured to receive a conductor from an AC power source;
a rectifier electrically connected to the at least three input connections, the rectifier having a plurality of diodes that are configured to rectify AC power having one or more phases;
a capacitor electrically connected to the rectifier;
a voltage supply connected to one end of the capacitor, the voltage supply being configured to produce a voltage on its output in response to a voltage on the capacitor reaching a predetermined level; and
a power factor control and boost circuit electrically connected to the rectifier and to the capacitor, the power factor control and boost circuit having:
three inductors;
three diodes that are different than the plurality of diodes of the rectifier, each inductor of the three inductors being electrically connected to the capacitor through one diode of the three diodes in a one-to-one correspondence;
three transistors, a collector of each transistor being electrically connected to one of the three inductors and an anode of one of the three diodes of the power factor control and boost circuit in a one-to-one correspondence between the three transistors, the three inductors, and the three diodes; and
a controller, the controller being configured to electrically connect each inductor of the three inductors to electrical ground independently of the other inductors of the three inductors and to electrically connect each inductor of the three inductors to the capacitor independently of the other inductors of the three inductors to charge the capacitor through each of the inductors of the three inductors and each of the diodes of the three diodes in the power factor control and boost circuit independently with current from the diodes of the three diodes in the power factor control and boost circuit; and
the controller is electrically connected to a gate of each transistor, the controller being further configured to activate each transistor to connect each inductor to electrical ground for a first predetermined number of electrical degrees of a predetermined pulse width modulated (PWM) period and to deactivate each transistor to disconnect electrically each inductor from electrical ground for a second predetermined number of electrical degrees of the PWM period to enable the current through the three diodes to charge the capacitor.

2. The power supply of claim 1 wherein the three transistors are insulated gate bipolar transistors (IGBT).

3. The power supply of claim 1 wherein the first predetermined number of electrical degrees of the PWM period is twice as long as the second predetermined number of electrical degrees of the PWM period.

4. The power supply of claim 2 further comprising:
a driver circuit for each IGBT, each driver circuit being electrically connected to the controller, to the voltage supply, and to a gate of only one of the three IGBTs to enable the controller to operate the IGBTs independently of one another.

5. The power supply of claim 4, each driver circuit further comprising:
an NPN transistor and a PNP transistor electrically connected in an emitter-follower configuration, an emitter of the NPN transistor and an emitter of the PNP transistor of each emitter-follower transistor configuration being electrically connected to one another and to the gate of one of the IGBTs and the collector of the NPN transistor being electrically connected to the voltage supply; and
the controller being further configured to send a signal to a gate of the NPN transistor and the PNP transistor to operate selectively each emitter-follower transistor configuration to activate the IGBT electrically connected to the emitter-follower transistor configuration for the first predetermined number of electrical degrees of the PWM period and to deactivate the IGBT electrically connected to the emitter-follower transistor configuration for the second predetermined number of electrical degrees of the PWM period.

6. The power supply of claim 1 further comprising:
another capacitor having one end electrically connected to a positive output of the rectifier and another end electrically connected to a negative output of the rectifier and to electrical ground, the one end of the other capacitor also being electrically connected to each inductor of the at least one inductor.

7. The power supply of claim 6 further comprising:
a diode having an anode electrically connected to the one end of the other capacitor and a cathode electrically connected to the capacitor that is charged by the inductors.

8. A method of supplying power for operating electrical equipment comprising:
connecting an AC power source to a rectifier through input connections configured to receive single phase and three phase AC power;
rectifying AC power from the AC source with a plurality of diodes in the rectifier that are configured to rectify AC power having one or more phases;
connecting one end of a capacitor to electrical ground and another end of the capacitor to the rectified AC power;
activating a voltage supply connected to the other end of the capacitor to produce a voltage at the output of the voltage supply in response to a voltage at the other end of the capacitor being at or above a predetermined level; and
selectively connecting with a controller the other end of the capacitor to one end of each inductor of three inductors independently of the other inductors of the three inductors to charge the capacitor with current through each inductor of the three inductors independently, each inductor of the three inductors being electrically connected to the capacitor through one diode of three diodes, which are different than the plurality of diodes of the rectifier, in a one-to-one correspondence, the selective connection of the capacitor and each inductor of the three inductors being performed by selectively activating with the controller three transistors to enable each transistor to connect the one end of one inductor of the three inductors to electrical ground for a first predetermined number of electrical degrees of a pulse width modulated (PWM) period and to deactivate each transistor to electrically connect the one end of the one inductor of the three inductors to the capacitor for a second predetermined number of electrical degrees of the PWM period to enable the rectified power to charge the capacitor through each inductor of the three inductors independently, a collector of each transistor being electrically connected to the one end of each inductor of the three inductors and an anode of one of the three diodes that are different than the diodes in the rectifier in a one-to-one correspondence between the three transistors, the three inductors, and the three diodes.

9. The method of claim 8, the selective activation of the three transistors further comprising:
selectively activating with the controller a gate of an insulated gate bipolar transistor (IGBT).

10. The method of claim 8 further comprising:
activating each transistor for the first predetermined number of electrical degrees of the PWM period, which is different than the second predetermined number of electrical degrees of the PWM period.

11. The method of claim 9 further comprising:
connecting a driver circuit to the output of the voltage supply; and
operating with the controller the driver circuit for each IGBT to selectively activate the gate of each IGBT.

12. The method of claim 11, the operation of each driver circuit further comprising:
connecting a collector of an NPN transistor to the output of the voltage supply; and
sending a signal with a controller to a gate of the NPN transistor and a gate of a PNP transistor electrically connected to one another in a emitter-follower configuration to operate selectively each emitter-follower transistor configuration to activate the IGBT electrically connected to the emitter-follower transistor configuration for the first predetermined number of electrical degrees of the PWM period and to deactivate the IGBT electrically connected to the emitter-follower transistor configuration for the second predetermined number of electrical degrees of the PWM period.

13. The method of claim 8 further comprising:
storing current received from the rectifier in another capacitor having one end electrically connected to a positive output of the rectifier and another end electrically connected to a negative output of the rectifier and to electrical ground, the one end of the other capacitor also being electrically connected to the three inductors.

14. The method of claim 13 further comprising:
connecting the other capacitor storing rectified power to the capacitor charged by the inductors of the at least one inductor through a diode having an anode electrically connected to the one end of the other capacitor connected to the positive output of the rectifier and a cathode electrically connected to the capacitor selectively charged by the three inductors.

* * * * *